(12) United States Patent
Bhansali et al.

(10) Patent No.: US 7,456,551 B2
(45) Date of Patent: Nov. 25, 2008

(54) PACKAGING AND INTEGRATION SYSTEM FOR MICRO SENSORS IN THE MARINE ENVIRONMENT

(75) Inventors: Shekhar Bhansali, Tampa, FL (US);
Ajay Malshe, Springdale, AR (US);
Shyam Aravamudhan, Tampa, FL (US)

(73) Assignees: University of South Florida, Tampa, FL (US); Board of Trustees of the University of Arkansas, Little Rock, AR (US)

( * ) Notice: Subject to any disclaimer, the term of this patent is extended or adjusted under 35 U.S.C. 154(b) by 168 days.

(21) Appl. No.: 11/609,445

(22) Filed: Dec. 12, 2006

(65) Prior Publication Data
US 2007/0194663 A1 Aug. 23, 2007

Related U.S. Application Data

(60) Provisional application No. 60/597,595, filed on Dec. 12, 2005.

(51) Int. Cl.
*H01L 41/08* (2006.01)
(52) U.S. Cl. .................................................. 310/337

(58) Field of Classification Search ................. 310/337, 310/336, 311, 338; 324/350; 367/136
See application file for complete search history.

(56) References Cited

U.S. PATENT DOCUMENTS

| | | | | |
|---|---|---|---|---|
| 5,892,690 | A * | 4/1999 | Boatman et al. | 340/870.02 |
| 6,842,006 | B2 * | 1/2005 | Conti et al. | 324/350 |
| 6,958,693 | B2 * | 10/2005 | Rothgeb et al. | 340/539.1 |
| 7,034,327 | B2 * | 4/2006 | Fucile | 250/573 |
| 7,275,420 | B2 * | 10/2007 | Discenzo | 73/54.28 |

OTHER PUBLICATIONS

FastCAT CTD Sensor, Sea-Bird Electronics, Inc., www.seabird.com.

* cited by examiner

*Primary Examiner*—Thomas M. Dougherty
*Assistant Examiner*—Karen B Addison
(74) *Attorney, Agent, or Firm*—Smith & Hopen, P.A.; Molly Sauter

(57) ABSTRACT

The integrated unmanned, affordable, microsystem in accordance with the present invention is used to deploy physical or chemical sensors for continuous monitoring of sea space over large time periods. The microsystem is capable of measuring ocean physical parameters over large time spans weeks, with higher accuracies and resolution and at significantly lower costs that the other sensors currently known in the art.

15 Claims, 1 Drawing Sheet

THE FIGURE
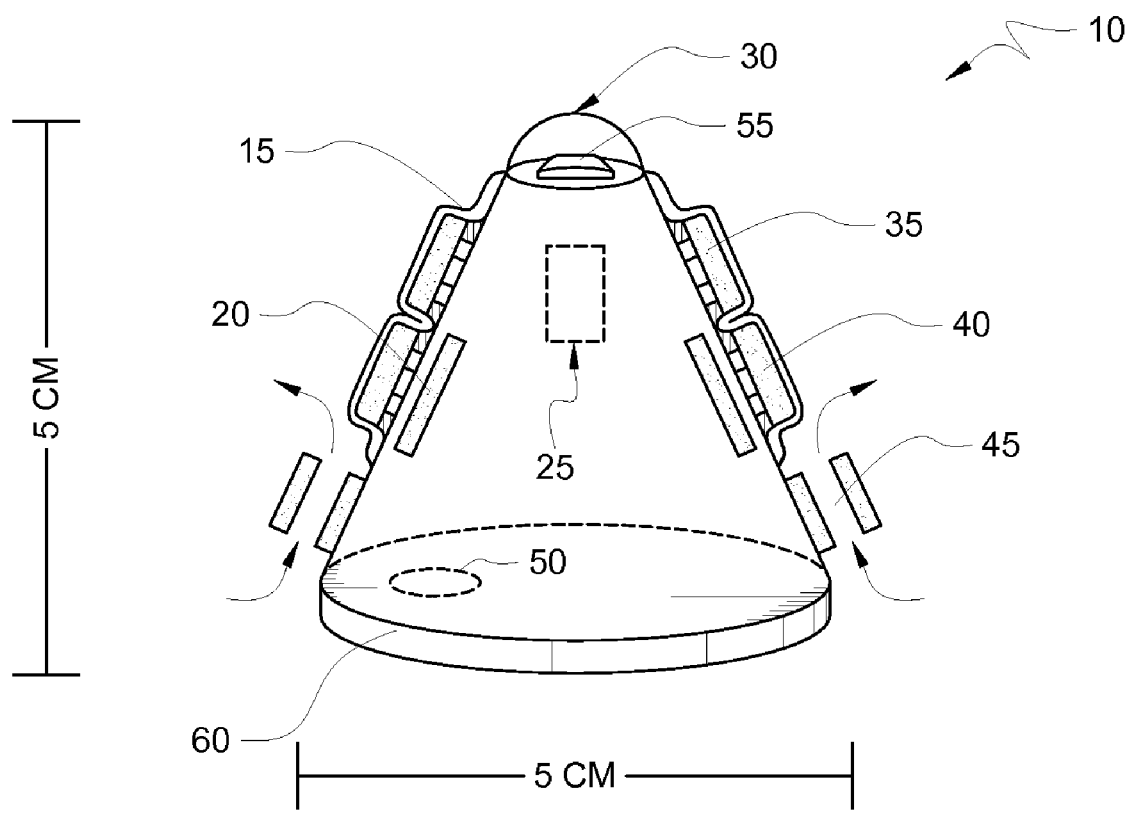

PACKAGING AND INTEGRATION SYSTEM FOR MICRO SENSORS IN THE MARINE ENVIRONMENT

CROSS REFERENCE TO RELATED APPLICATIONS

This application claims priority to currently pending U.S. provisional patent application No. 60/597,595, entitled: "Packaging and Integrated Scheme for Micro Sensors in the Marine Environment," filed Dec. 12, 2005, by the same inventors, the contents of which are herein incorporated by reference.

BACKGROUND OF THE INVENTION

Physical and biological processes in the harsh oceanic environment are known to be critically influenced by ocean parameters such as salinity, temperature and mixed layer depth. These processes range from changing strengths of ocean currents to coral growth to global warming. Historically, marine researchers have been unable to measure ocean parameters continuously throughout large volumes of sea-space and over large time spans. Accepted methods for measuring ocean parameters usually involve research vessels, Autonomous Underwater Vehicles (AUV) or Remote Operated Vehicles (ROV), which can only sense local environmental variables at a single point in space-time. Use of multiple vehicles improves measurement quality. However, the gain from higher spatial sampling frequency is directly related to the number of additional vessels used. More support vessels, whether AUVs or ships, add significant costs to the sampling procedure. While remote sensing and in-situ buoy systems have provided part of the solution, both have limitations. Also, current sensors known in the art are bulky and limited in operation. The sensors currently known in the art are about 60-95 cm long and cost around $2,000.

Accordingly, what is needed in the art is an improved sensor module for use in the marine environment that allows for higher spatial sampling frequency and reduces the cost over other methods currently known in the art.

SUMMARY OF INVENTION

The integrated unmanned, affordable, microsystem in accordance with the present invention can be used to deploy physical or chemical sensors for continuous monitoring of sea space over large time periods. The microsystem of the present invention is capable of measuring ocean physical parameters over large time spans, with higher accuracies and resolution and at significantly lower costs than the other sensors currently known in the art.

In a particular embodiment, the present invention provides a submersible marine micro-sensor module including a main body housing an intelligence module, at least one piezoelectric shaker coupled to the main body, a communication port coupled to the main body and in communication with the intelligence module, at least one marine micro-sensor coupled to the main body and in communication with the intelligence module and a battery module to supply power to the intelligence module, the piezoelectric shaker, the communication port and the at least one micro marine-sensor.

While the main body of the module may take on many shapes, in a preferred embodiment, the main body is in the shape of a circular cone and is designed to be substantially self buoyant.

It is within the scope of the present invention to form the main body of a variety of polymer or synthetic materials. In a particular embodiment, the main body is formed from a synthetic resin or designed polymers, such as Bakelite, Lumiform, or Cytop.

In a specific embodiment, the main body is shaped as a circular cone and a transmission window is positioned at the vertex of the cone. In this embodiment, the communication port may be positioned within the transmission window.

The present invention is designed is to be small is size relative to the other marine sensors known in the art. In a particular embodiment the module is circular conical in shape and has an axis of about 5 centimeters and a base diameter of about 5 centimeters.

The intelligence module of the present invention may include a data storage module to collect the information provide by the sensors that will be communicated through the communication module.

It is within the scope of the present invention to include a variety of marine micro-sensors with the module, including, but not limited to, pressure sensors, temperature sensors and conductivity sensors.

In a specific embodiment, the marine micro-sensors are positioned on the outside surface of the main body and are then coated with a polymer material to protect the sensor from the marine environment.

In accordance with a particular embodiment, the main body of the module is designed to be self buoyant. However, an additional buoyancy control module in additionally within the scope of the invention.

As such, the present invention provides an improved sensor module for use in the marine environment that allows for higher spatial sampling frequency and reduces the cost over other methods currently known in the art.

BRIEF DESCRIPTION OF THE DRAWINGS

For a fuller understanding of the invention, reference should be made to the following detailed description, taken in connection with the accompanying drawings, in which:

The FIGURE is a diagrammatic view of a marine micro-sensor module in accordance with the present invention.

DETAILED DESCRIPTION OF THE PREFERRED EMBODIMENT

The technology of the present invention enables the integration of micro-sensors, such as conductivity, temperature, depth/pressure, and CTD, that leverages micro electro mechanical systems (MEMS) systems, and novel ambient specific packaging schemes for the harsh marine environment.

As shown with reference to FIG. 1, the present invention provides a submersible marine micro-sensor module 10 including a main body 15 housing an intelligence module 25, at least one piezoelectric shaker 20 coupled to the main body, a communication port 55 coupled to the main body 15 and in communication with the intelligence module 25, at least one marine micro-sensor 35, 40, 45 coupled to the main body 15 and in communication with the intelligence module 25 and a battery module 50 to supply power to the intelligence module 25, the piezoelectric shaker 20, the communication port 55 and the at least one micro marine-sensor 35, 40, 45. Power is provided to he intelligence module 25 and the communication port 55 through a microbattery 50.

The main body 15 of the module may be formed of many materials known in the art, including, but not limited to Bakelite, Cytop and Lumiform, which are polymers known in the art. Additionally, the micro-sensor 35, 40, 45 may be positioned on the exterior surface of the main body and then covered with a protective polymer or other anti-bio fouling material.

The main body 15 houses many of the other components of the system, including the intelligence module 25, which may include memory, data storage, communication means, or other circuitry responsible for the operation of the module.

In a particular embodiment, a piezoelectric shaker 20 is coupled to the main body of the system. The piezoelectric shaker 20 is similar to a piezo disc, such as that used in a cell phone in the vibrate mode and is effective in removing objects that may become attached to the surface of the main body 15 of the system 10 when submersed in the marine environment.

While various shapes of the main body 10 are within the scope of the present invention, in a particular embodiment, the main body 10 is circular conical in shape. In a specific embodiment, the vertex of the main body 10 is about 5 centimeters and the diameter of the base of the main body 10 is about 5 centimeters. The shape of the main body is designed to be self-buoyant. In an additional embodiment, buoyancy of the module may be enhanced through a buoyancy control module 60.

In a specific embodiment, the module is adapted for use at depths up to 500 meters at 700 PSI and between 4-30° C.

The communication port 55 of the system 10 is used to communicate the data gathered by the sensors to a receiving station. In a specific embodiment the communication port is positioned at the apex of the main body 10 in a transmission window 30. Various other positions of the communication port 55 are within the scope of the present invention.

A variety of micro-sensors may be used to collect information within the marine environment using the module in accordance with the present invention. Pressure sensors 35, temperature sensors 40 and conductivity sensors 45 are within the scope of the present invention, in addition to many other sensors known in the art for the collection of chemical and physical data in the marine environment. In addition, the micro-sensors in accordance with the present invention may be formed using microelectromechanical techniques which are known in the art.

Accordingly, the integrated unmanned, affordable, microsystem in accordance with the present invention can be used to deploy physical or chemical sensors for continuous monitoring of sea space over large time periods. The microsystem will be capable of measuring ocean physical parameters over large time spans weeks, with higher accuracies and resolution and at significantly lower costs than the other sensors currently known in the art.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. A submersible marine micro-sensor module comprising:
   a main body housing an intelligence module;
   at least one piezoelectric shaker coupled to the main body;
   a communication port coupled to the main body and in communication with the intelligence module;
   at least one marine micro-sensor coupled to the main body and in communication with the intelligence module; and
   a battery module to supply power to the intelligence module, the piezoelectric shaker, the communication port and the at least one micro marine-sensor.

2. The module of claim 1, wherein the main body in the shape of a circular cone and is designed to be substantially self buoyant.

3. The module of claim 1, wherein the main body is formed from a synthetic resin.

4. The module of claim 1, wherein the communication port is positioned within a transmission window.

5. The module of claim 2, wherein the main body further comprises a transmission window positioned at the vertex of the circular cone, and the communication port is positioned within the transmission window.

6. The module of claim 2, wherein the axis of the circular conical shaped main body is about 5 centimeters.

7. The module of claim 2, wherein the diameter of the base of the circular conical shaped main body is about 5 centimeters.

8. The module of claim 1, wherein the intelligence module further comprises a data storage module.

9. The module of claim 1, wherein the at least one marine micro-sensor is a pressure sensor.

10. The module of claim 1, wherein the at least one marine micro-sensor is a temperature sensor.

11. The module of claim 1, wherein the at least one marine micro-sensor is a conductivity sensor.

12. The module of claim 1, wherein the at least one marine micro-sensor is a microelectromechanical (MEMS) sensor.

13. The module of claim 1, wherein the at least one marine micro-sensor is positioned on an exterior surface of the main body and coated with an anti bio-fouling material to protect the sensor from the marine environment.

14. The module of claim 1, wherein the main body of the module is designed to be self buoyant.

15. The module of claim 1, further comprising a buoyancy control module coupled to the main body.

* * * * *